(12) United States Patent
Reyna et al.

(10) Patent No.: US 9,239,890 B2
(45) Date of Patent: Jan. 19, 2016

(54) SYSTEM AND METHOD FOR CAROUSEL CONTEXT SWITCHING

(75) Inventors: Jorge Fernando Reyna, Hayward, CA (US); Gilles Serge BianRosa, Redwood City, CA (US); Olivier Chalouhi, Redwood City, CA (US); Keith Ohlfs, Redwood City, CA (US)

(73) Assignee: FANHATTAN, INC., San Mateo, CA (US)

( * ) Notice: Subject to any disclaimer, the term of this patent is extended or adjusted under 35 U.S.C. 154(b) by 191 days.

(21) Appl. No.: 13/149,561

(22) Filed: May 31, 2011

(65) Prior Publication Data

US 2012/0311440 A1 Dec. 6, 2012

(51) Int. Cl.
*G06F 3/048* (2013.01)
*G06F 17/30* (2006.01)

(52) U.S. Cl.
CPC ................................ *G06F 17/30994* (2013.01)

(58) Field of Classification Search
USPC ........................................................ 715/716
See application file for complete search history.

(56) References Cited

U.S. PATENT DOCUMENTS

| | | | |
|---|---|---|---|
| 5,724,106 A | 3/1998 | Autry et al. | |
| 6,662,177 B1 | 12/2003 | Martino et al. | |
| 6,880,132 B2 * | 4/2005 | Uemura | 715/848 |
| 7,383,503 B2 | 6/2008 | Banks | |
| 7,669,123 B2 | 2/2010 | Zuckerberg et al. | |
| 7,698,654 B2 | 4/2010 | Fong et al. | |
| 7,743,116 B2 | 6/2010 | Goldeen et al. | |
| 7,761,812 B2 | 7/2010 | Ostojic et al. | |
| 7,912,875 B2 | 3/2011 | Gosper et al. | |
| 2001/0017634 A1 | 8/2001 | Scott | |
| 2001/0028369 A1 | 10/2001 | Gallo et al. | |
| 2002/0015064 A1 | 2/2002 | Robotham et al. | |
| 2002/0054164 A1 | 5/2002 | Uemura | |
| 2003/0112279 A1 | 6/2003 | Irimajiri | |

(Continued)

FOREIGN PATENT DOCUMENTS

| | | | |
|---|---|---|---|
| KR | 1020110024808 A | 3/2011 | |
| KR | 1020110040428 A | 4/2011 | |

(Continued)

OTHER PUBLICATIONS

"U.S. Appl. No. 13/149,605, Non Final Office Action mailed May 8, 2013", 13 pgs.

(Continued)

*Primary Examiner* — Peiyong Weng
(74) *Attorney, Agent, or Firm* — Ropes & Gray LLP

(57) ABSTRACT

In a method and system for navigating content, a plurality of content filter panels are provided in a user interface of an application for browsing and viewing media content. The content filter panels each contain at least one selectable filter for filtering media content items. A direction of movement of a navigation indicator within an active content filter panel is determined, with the navigation indicator being controlled by a user. Based on a determination of a movement direction of the navigation indicator in a first axis, the active content filter panel is switched from a first content filter panel to a second content filter panel. Based on a determination of a movement direction of the navigation indicator in a second axis, the media content items are filtered according to a selectable filter of the active content filter panel selected by the navigation indicator. At least one of the filtered media content items is caused to be displayed in the user interface.

24 Claims, 12 Drawing Sheets

(56) References Cited

U.S. PATENT DOCUMENTS

| | | | |
|---|---|---|---|
| 2003/0112467 A1 | 6/2003 | McCollum et al. | |
| 2003/0233460 A1 | 12/2003 | Drucker et al. | |
| 2004/0189694 A1 | 9/2004 | Kurtz et al. | |
| 2006/0004873 A1 | 1/2006 | Wong et al. | |
| 2006/0143568 A1 | 6/2006 | Milener et al. | |
| 2006/0161863 A1* | 7/2006 | Gallo | 715/810 |
| 2006/0268100 A1 | 11/2006 | Karukka et al. | |
| 2007/0186186 A1 | 8/2007 | Both et al. | |
| 2008/0046931 A1 | 2/2008 | Corbett et al. | |
| 2008/0060010 A1 | 3/2008 | Kelts | |
| 2008/0066012 A1 | 3/2008 | Goodwin et al. | |
| 2008/0104051 A1 | 5/2008 | Gosper | |
| 2008/0313572 A1 | 12/2008 | Waldman et al. | |
| 2009/0002218 A1 | 1/2009 | Rigazio et al. | |
| 2009/0002335 A1 | 1/2009 | Chaudhri | |
| 2009/0089248 A1 | 4/2009 | Alexander et al. | |
| 2009/0125843 A1 | 5/2009 | Billmaier et al. | |
| 2009/0132949 A1 | 5/2009 | Bosarge | |
| 2009/0153288 A1 | 6/2009 | Hope et al. | |
| 2009/0153289 A1 | 6/2009 | Hope et al. | |
| 2009/0158206 A1 | 6/2009 | Myllyla | |
| 2009/0199130 A1 | 8/2009 | Tsern et al. | |
| 2009/0204677 A1 | 8/2009 | Michaelis et al. | |
| 2009/0239587 A1 | 9/2009 | Negron et al. | |
| 2009/0240119 A1 | 9/2009 | Schwaibold et al. | |
| 2009/0278642 A1 | 11/2009 | Fullerton et al. | |
| 2009/0289063 A1 | 11/2009 | Fullerton et al. | |
| 2009/0319899 A1 | 12/2009 | Moon et al. | |
| 2010/0070575 A1 | 3/2010 | Bergquist et al. | |
| 2010/0076960 A1 | 3/2010 | Sarkissian et al. | |
| 2010/0077432 A1 | 3/2010 | Vanduyn et al. | |
| 2010/0131844 A1 | 5/2010 | Wohlert | |
| 2010/0162166 A1 | 6/2010 | Pascal et al. | |
| 2010/0175026 A1 | 7/2010 | Bortner et al. | |
| 2010/0231533 A1* | 9/2010 | Chaudhri | 345/173 |
| 2010/0274797 A1 | 10/2010 | Tichatschke | |
| 2010/0333133 A1 | 12/2010 | Krakirian et al. | |
| 2011/0018817 A1 | 1/2011 | Kryze et al. | |
| 2011/0107272 A1* | 5/2011 | Aguilar | 715/853 |
| 2011/0267291 A1 | 11/2011 | Choi et al. | |
| 2011/0270876 A1 | 11/2011 | Gill et al. | |
| 2012/0139847 A1 | 6/2012 | Hunt | |
| 2012/0162101 A1 | 6/2012 | Song et al. | |
| 2012/0162536 A1 | 6/2012 | Sibilsky et al. | |
| 2012/0311440 A1 | 12/2012 | Reyna et al. | |
| 2012/0311441 A1 | 12/2012 | Reyna | |
| 2012/0311453 A1 | 12/2012 | Reyna et al. | |
| 2012/0311481 A1 | 12/2012 | Reyna et al. | |
| 2012/0311486 A1 | 12/2012 | Reyna et al. | |
| 2012/0311502 A1 | 12/2012 | Reyna et al. | |
| 2012/0319989 A1 | 12/2012 | Argiro | |
| 2013/0176102 A1 | 7/2013 | Bianrosa et al. | |
| 2013/0179812 A1 | 7/2013 | Bianrosa et al. | |

FOREIGN PATENT DOCUMENTS

| | | | |
|---|---|---|---|
| WO | WO-2011084950 | A2 | 7/2011 |
| WO | WO-2012166825 | A2 | 12/2012 |
| WO | WO-2012166825 | A3 | 12/2012 |
| WO | WO-2012166826 | A3 | 12/2012 |
| WO | WO-2012166892 | A2 | 12/2012 |
| WO | WO-2012166892 | A3 | 12/2012 |
| WO | WO-2012166919 | A3 | 12/2012 |
| WO | WO-2012166925 | A2 | 12/2012 |
| WO | WO-2012166925 | A3 | 12/2012 |

OTHER PUBLICATIONS

"U.S. Appl. No. 13/149,644, Final Office Action mailed May 1, 2013", 15 pgs.

"U.S. Appl. No. 13/149,664, Final Office Action mailed Apr. 11, 2013", 13 pgs.

"U.S. Appl. No. 13/275,176, Non Final Office Action mailed May 24, 2013", 12 pgs.

"U.S. Appl. No. 13/347,360, Non Final Office Action mailed Apr. 25, 2013", 35 pgs.

"U.S. Appl. No. 13/347,466, Non Final Office Action mailed Apr. 25, 2013", 30 pgs.

"International Application Serial No. PCT/US2012/040049, International Search Report mailed Jan. 31, 2013", 6 pgs.

"International Application Serial No. PCT/US2012/040049, Written Opinion mailed Jan. 31, 2013", 4 pgs.

"International Application Serial No. PCT/US2012/040218, International Search Report mailed Jan. 17, 2013", 3 pgs.

"International Application Serial No. PCT/US2012/040218, Written Opinion mailed Jan. 17, 2013", 3 pgs.

"International Application Serial No. PCT/US2013/020952, International Search Report mailed Mar. 26, 2013", 2 pgs.

"International Application Serial No. PCT/US2013/020952, Written Opinion mailed Mar. 26, 2013", 6 pgs.

"International Application Serial No. PCT/US2013/020963, International Search Report mailed Mar. 26, 2013", 2 pgs.

"International Application Serial No. PCT/US2013/020963, Written Opinion mailed Mar. 26, 2013", 4 pgs.

"U.S. Appl. No. 13/149,605, Non Final Office Action mailed Oct. 5, 2012", 10 pgs.

"U.S. Appl. No. 13/149,605, Response filed Jan. 7, 2013 to Non Final Office Action mailed Oct. 5, 2012", 10 pgs.

"U.S. Appl. No. 13/149,644, Non Final Office Action mailed Oct. 5, 2012", 13 pgs.

"U.S. Appl. No. 13/149,644, Response filed Jan. 7, 2013 to Office Action mailed Oct. 5, 2012", 13 pgs.

"U.S. Appl. No. 13/149,664, Response filed Dec. 19, 2012 to Non Final Office Action mailed Sep. 19, 2012", 11 pgs.

"U.S. Appl. No. 13/149,664, Non Final Office Action mailed Sep. 19, 2012", 11 pgs.

"U.S. Appl. No. 13/275,176, Response filed Apr. 3, 2012 to Non Final Office Action mailed Jan. 3, 2012", 11 pgs.

"U.S. Appl. No. 13/275,176, Response filed Jul. 17, 2012 to Final Office Action mailed Apr. 17, 2012", 10 pgs.

"U.S. Appl. No. 13/275,176, Final Office Action mailed Apr. 17, 2012", 10 pgs.

"U.S. Appl. No. 13/275,176, Non Final Office Action Mailed Jan. 3, 2012", 10 pgs.

"International Application Serial No. PCT/US2012/040048, Search Report mailed Nov. 29, 2012", 3 pgs.

"International Application Serial No. PCT/US2012/040048, Written Opinion mailed Nov. 29, 2012", 3 pgs.

"International Application Serial No. PCT/US2012/040170, International Search Report mailed Dec. 28, 2012", 3 pgs.

"International Application Serial No. PCT/US2012/040170, Written Opinion mailed Dec. 28, 2012", 3 pgs.

"International Application Serial No. PCT/US2012/040208, International Search Report mailed Dec. 10, 2012", 4 pgs.

"International Application Serial No. PCT/US2012/040208, Written Opinion mailed Dec. 10, 2012", 3 pgs.

"U.S. Appl. No. 13/275,176, Response filed Aug. 23, 2013 to Non Final Office Action mailed May 24, 2013", 14 pgs.

"U.S. Appl. No. 13/347,360, Final Office Action mailed Sep. 9, 2013", 32 pgs.

"U.S. Appl. No. 13/149,605, Examiner Interview Summary mailed Jan. 8, 2014", 3 pgs.

"U.S. Appl. No. 13/149,605, Response filed Jan. 15, 2014 Final Office Action mailed Nov. 8, 2013", 9 pgs.

"U.S. Appl. No. 13/347,360, Response filed Jan. 9, 2014 to Final Office Action mailed Sep. 9, 2013", 14 pgs.

"U.S. Appl. No. 14/081,138, Response filed Dec. 3, 2013 to Final Office Action mailed Sep. 30, 2013", 14 pgs.

"International Application Serial No. PCT/US2012/040048, International Preliminary Report on Patentability mailed Dec. 12, 2013", 5 pgs.

"International Application Serial No. PCT/US2012/040049, International Preliminary Report on Patentability mailed Dec. 12, 2013", 6 pgs.

"International Application Serial No. PCT/US2012/040170, International Preliminary Report on Patentability mailed Dec. 12, 2013", 6 pgs.

(56) References Cited

OTHER PUBLICATIONS

"International Application Serial No. PCT/US2012/040208, International Preliminary Report on Patentability mailed Dec. 12, 2013", 5 pgs.

"International Application Serial No. PCT/US2012/040218, International Preliminary Report on Patentability mailed Dec. 12, 2013", 5 pgs.

"U.S. Appl. No. 13/149,605, Response filed Jul. 22, 2013 to Non Final Office Action mailed May 8, 2013", 9 pgs.

"U.S. Appl. No. 13/149,644 , Response filed Jun. 27, 2013 to Final Office Action mailed May 1, 2013", 13 pgs.

"U.S. Appl. No. 13/149,644, Examiner Interview Summary mailed Jul. 5, 2013", 3 pgs.

"U.S. Appl. No. 13/149,664 , Response filed Jun. 11, 2013 to Final Office Action mailed Apr. 11, 2013", 12 pgs.

"U.S. Appl. No. 13/347,360 , Response filed Jul. 25, 2013 to Non Final Office Action mailed Apr. 25, 2013", 19 pgs.

"U.S. Appl. No. 13/149,605, Final Office Action mailed Nov. 8, 2013", 13 pgs.

"U.S. Appl. No. 13/275,176, Examiner Interview Summary mailed Oct. 21, 2013", 3 pgs.

"U.S. Appl. No. 13/275,176, Final Office Action mailed Sep. 30, 2013", 12 pgs.

U.S. Appl. No. 13/347,360, Response filed Jun. 9, 2014 to Non Final Office Action mailed Mar. 7, 2014, 12 pgs.

U.S. Appl. No. 13/347,360, Non Final Office Action mailed Mar. 7, 2014, 16 pgs.

U.S. Appl. No. 13/347,360, Response filed Jan. 20, 2015 to Final Office Action mailed Aug. 18, 2014, 11 pgs.

U.S. Appl. No. 13/347,360, Final Office Action mailed Aug. 18, 2014, 30 pgs.

\* cited by examiner

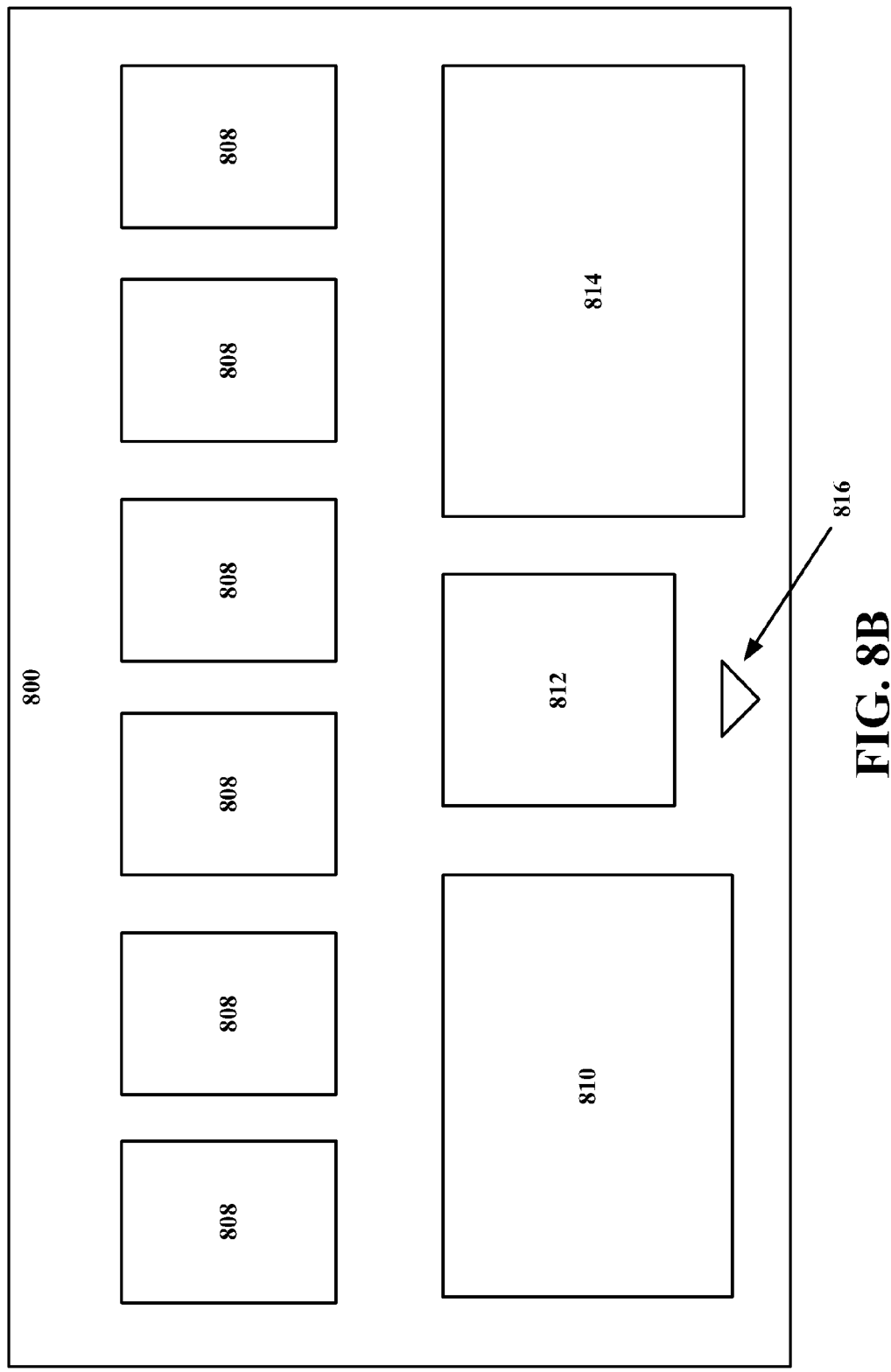

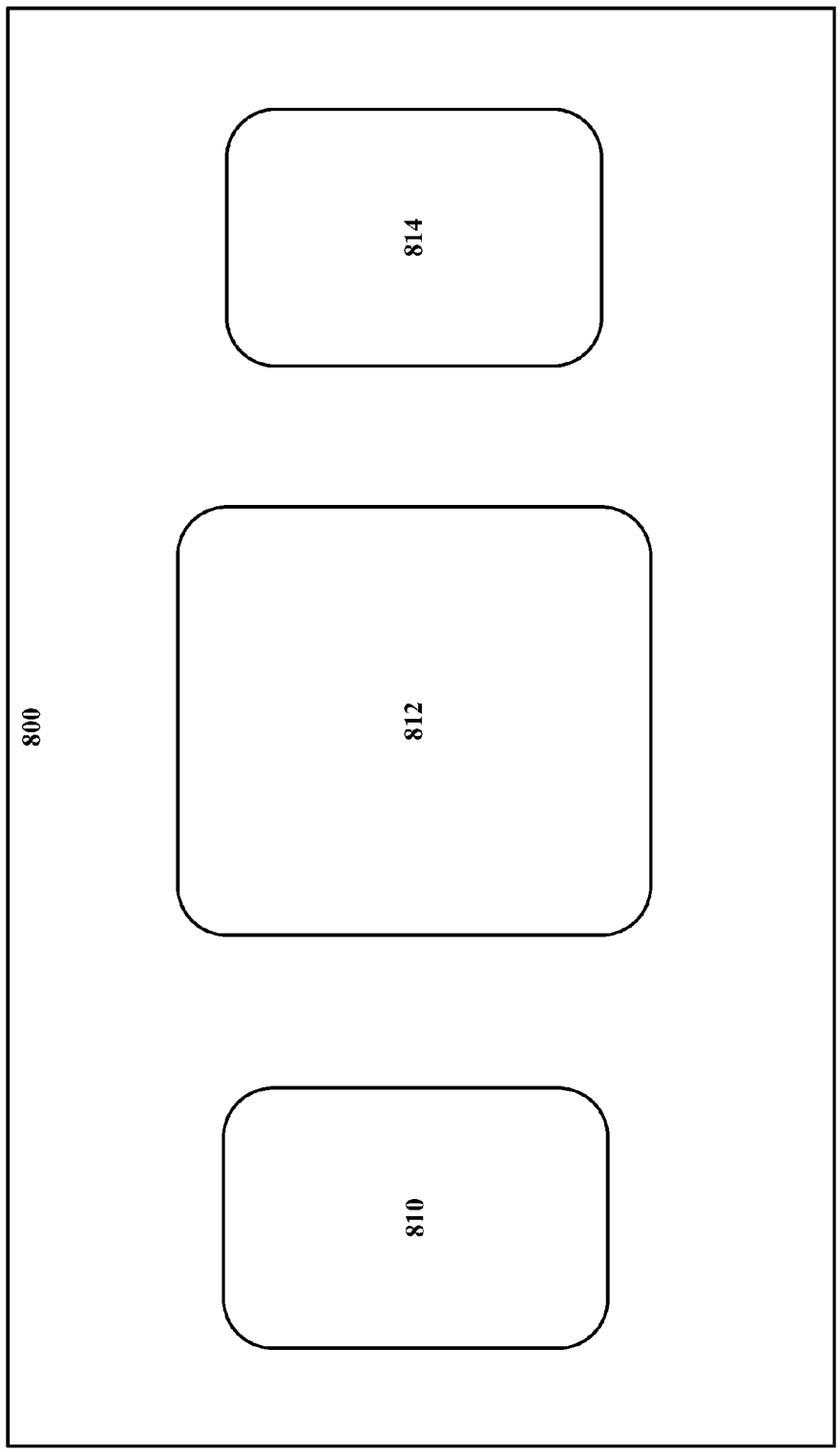

SYSTEM AND METHOD FOR CAROUSEL CONTEXT SWITCHING

CROSS-REFERENCE TO RELATED APPLICATIONS

This application is related to application Ser. No. 13/149,605, entitled "System and Method for Pivot Navigation of Content," filed concurrently herewith, application Ser. No. 13/149,644, entitled "System and Method for Pyramidal Navigation," filed concurrently herewith, and application Ser. No. 13/149,664, entitled "System and Method for Power Browsing of Content," filed concurrently herewith, which applications are incorporated herein by reference in their entirety.

TECHNICAL FIELD

Example embodiments of the present application generally relate to media content, and more specifically, to a system and method for efficient switching of contexts by which content is navigated.

BACKGROUND

Navigating among a vast sea of content is a particularly difficult and burdensome task for a user. Today's user interfaces and search engines offer some insights and approaches to navigating among content, but often these interfaces and search engines are designed to navigate among content in a rigid manner.

BRIEF DESCRIPTION OF DRAWINGS

The embodiments disclosed in the present disclosure are illustrated by way of example, and not by way of limitation, in the figures of the accompanying drawings. Like reference numerals refer to corresponding parts throughout the drawings.

FIG. 8B is a diagram of an example user interface for pyramidal navigation of content, according to some embodiments.

FIG. 8C is a diagram of an example user interface for pyramidal navigation of content, according to some embodiments.

DETAILED DESCRIPTION

Although the disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

In various embodiments, a system and method for navigating content are disclosed. A plurality of content filter panels may be provided in a user interface of an application for browsing and viewing media content. The content filter panels each may contain at least one selectable filter for filtering media content items. A direction of movement of a navigation indicator within an active content filter panel is determined, with the navigation indicator being controlled by a user. Based on a determination of a movement direction of the navigation indicator in a first axis, the active content filter panel may be switched from a first content filter panel to a second content filter panel. Based on a determination of a movement direction of the navigation indicator in a second axis, the media content items may be filtered according to a selectable filter of the active content filter panel selected by the navigation indicator. At least one of the filtered media content items is caused to be displayed in the user interface in response to the filtering.

Figure 1:
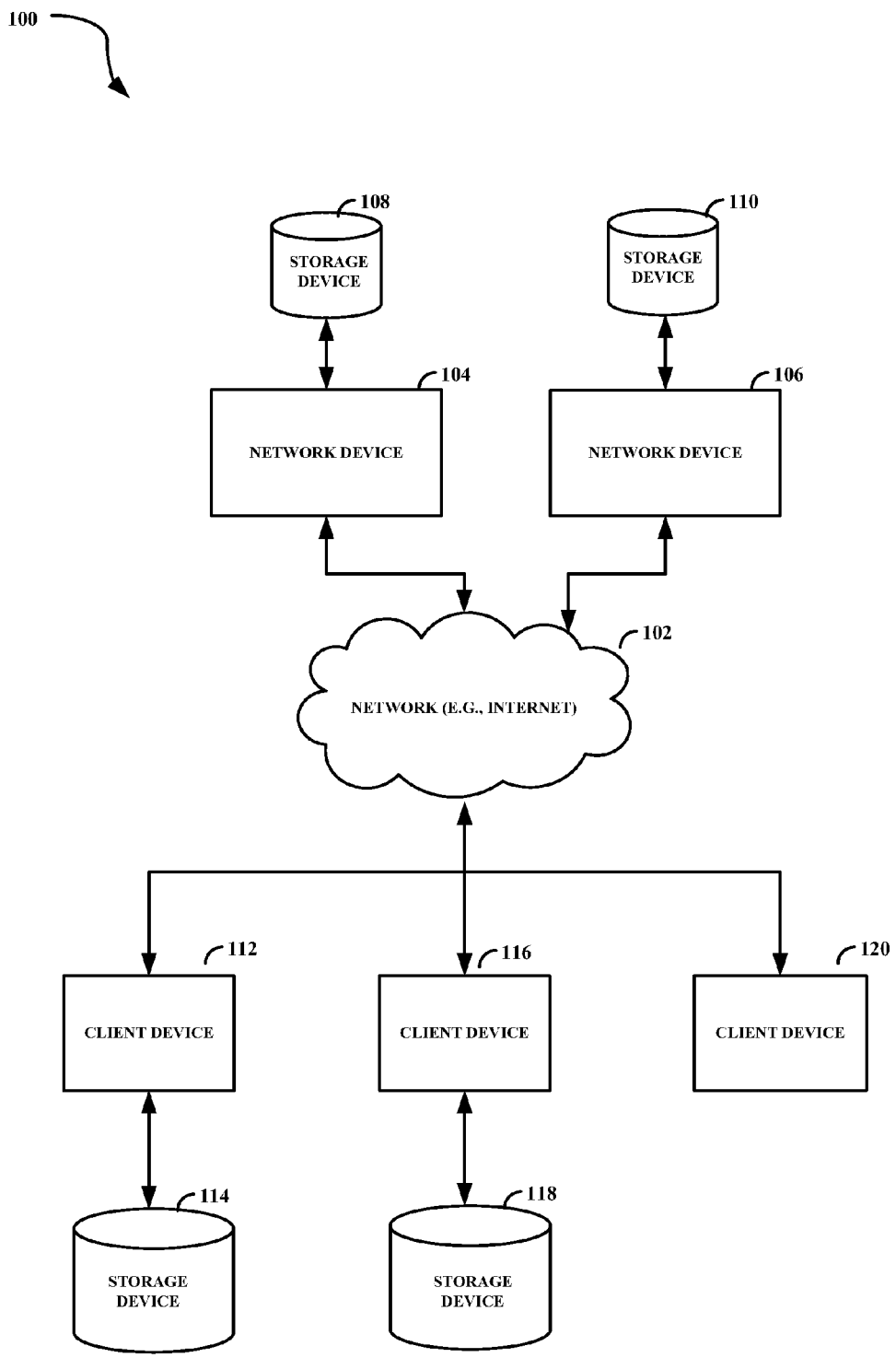
FIG. 1 is a block diagram illustrating a network system having an architecture configured for exchanging data over a network, according to some embodiments.

FIG. 1 is a block diagram illustrating an example network system 100 connecting one or more client devices 112, 116, and 120 to one or more network devices 104 and 106 via a network 102. The one or more client devices 112, 116, and 120 may include Internet- or network-enabled devices, such as consumer electronics devices (e.g., televisions, DVD players, Blu-Ray® players, set-top boxes, portable audio/video players, gaming consoles) and computing devices (e.g., personal computer, laptop, tablet computer, smart phone, mobile device). The type of client devices is not intended to be limiting, and the foregoing devices listed are merely examples. The client devices 112, 116, and 120 may have remote, attached, or internal storage devices 114, 118. For illustrative purposes only, although client devices 112 and 116 are shown in FIG. 1 as having connected storage devices 114 and 118, respectively, and client device 120 is shown without a connected storage device, in some embodiments, each client device 112, 116, and 120 may have local access to one or more storage or memory devices.

In some embodiments, one or more of the client devices 112, 116, and 120 may have installed thereon and may execute a client application (not shown) that enables the client device to serve as a local media server instance. The client application may search for and discover media content (e.g., audio, video, images) stored on the device as well as media content stored on other networked client devices having the client application installed thereon. The client application may aggregate the discovered media content, such that a user may access local content stored on any client device having the client application installed thereon. In some embodiments, the aggregated discovered media content may be separated by device, such that a user is aware of the network devices connected to a particular device and the content stored on the connected network devices. In some embodiments, each connected network device may be represented in the application by an indicator, such as an icon, an image, or a graphic. When a connected network device is selected, the indicator may be illuminated or highlighted to indicate that that particular network device is being accessed.

In some embodiments, the discovered media content may be stored in an aggregated data file, which may be stored on the client device. The local content may be indexed by the client device in which the content resides. The client application also may aggregate and present a variety of remote sources to the user from which the user is able to download, stream, or otherwise access a particular media content item. For example, the client application may present to the user all streaming, rental, and purchase options for a particular media content item to the extent they exist and are available for access.

One or more network devices 104 and 106 may be communicatively connected to the client devices 112, 116, and 120 via network 102. In some embodiments, the network devices 104 and 106 may be servers storing media content or metadata relating to media content available to be accessed by the client devices 112, 116, and 120. In some embodiments, the network devices 104 and 106 may include proprietary servers related to the client application as well as third party servers hosting free or subscription-based content. Additional third-party servers may include servers operating as metadata repositories and servers hosting electronic commerce sites. For example, in the context of movies, third-party servers may be servers associated with the themoviedb.org and other third-party aggregators that store and deliver movie metadata in response to user requests. In some embodiments, some of the third-party servers may host websites offering merchandise related to a content item for sale. The network devices 104 and 106 may include attached storage devices or may interface with databases or other storage devices 108 and 110. For illustrative purposes only, the network devices 104 and 106 each have been shown as a single device in FIG. 1, although it is contemplated that the network devices 104 and 106 may include one or more web servers, application servers, database servers, and so forth, operating independently or in conjunction to store and deliver content via network 102.

In some embodiments where one or more of the network devices 104 and 106 are proprietary servers associated with the client application, the proprietary servers may store metadata related to media content and data that facilitates identification of media content across multiple content servers. For example, the proprietary servers may store identifiers for media content that are used to interface with third party servers that store or host the media content. The proprietary servers further may include one or more modules capable of verifying the identity of media content and providing access information concerning media content (e.g., the source(s) of media content, the format(s) of media content, the availability of media content).

The client application installed on one or more of the client devices 112, 116, and 120 may enable a user to search for media content or navigate among categories of media content. To find media content, a user may enter search terms in a user interface of the client application to retrieve search results, or the user may select among categories and sub-categories of media content to identify a particular media content item. For each browsed content item, the client application may display metadata associated with the content item. The metadata may be retrieved from both local and remote sources. The metadata may include but are not limited to a title of the content item, one or more images (e.g., wallpapers, backgrounds, screenshots) or video clips related to the content item, a release date of the content item, a cast of the content item, one or more reviews of the content item, and release windows and release dates for various distribution channels for the browsed content item.

Figure 2:
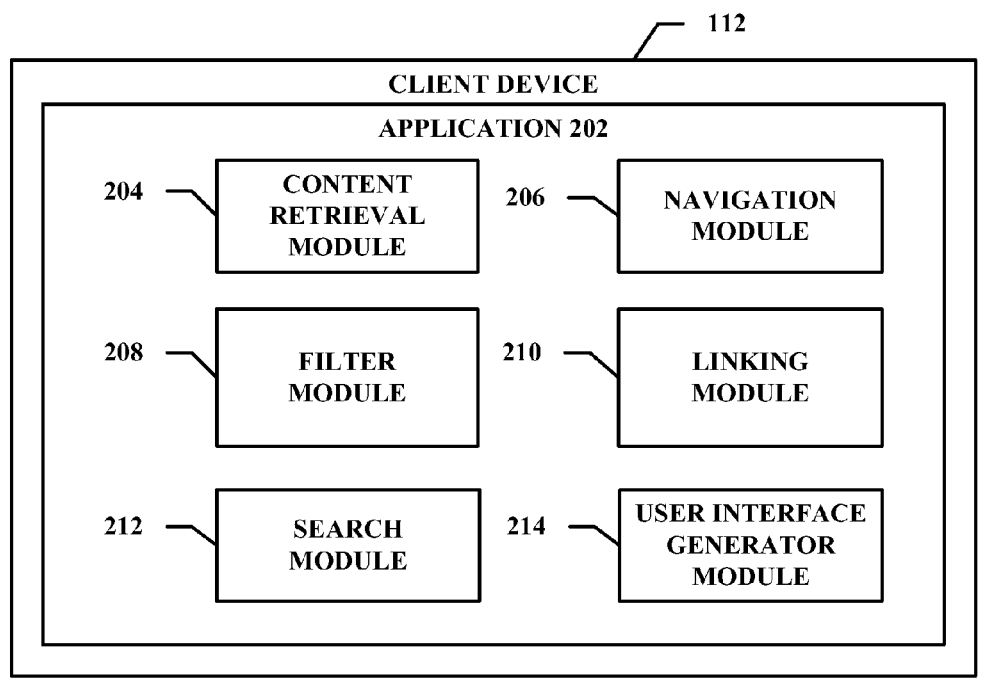
FIG. 2 is a block diagram illustrating modules of an application, according to some embodiments.

FIG. 2 is a block diagram illustrating modules of an application, according to some embodiments. Although the modules are shown in FIG. 2 as being part of a client device, it is contemplated that the modules may be implemented on a network device, such as a server. In an example embodiment, the application 202 may be the client application discussed with reference to FIG. 1. In an example embodiment, one or more processors of a client device or a network device may execute or implement the modules.

The application 202 includes modules, such as a content retrieval module 204, a navigation module 206, a filter module 208, a linking module 210, a search module 212, and a user interface generator module 214, to perform operations, according to some embodiments.

The content retrieval module 204 may retrieve content and content-related data from networked devices, such as content sources and metadata repositories. Content sources may include both locally networked sources (e.g., other networked devices executing the application 202) and remote sources, such as third party content providers. In some embodiments, the content retrieval module 204 may retrieve metadata related to content items and may use the metadata to populate a user interface with information related to content items, such as movies and television programs. For example, the content retrieval module 204 may retrieve metadata such as a content titles, cover art, screenshots, content descriptions, plot synopses, and cast listings. In some embodiments, the metadata may be displayed as part of listings of content presented to a user during application navigation and search operations. For example, the metadata may be displayed when a user is navigating among categories of content or is searching for a particular content item. Each content item discovered during navigation or searching may be populated with the retrieved metadata. In some embodiments, metadata is retrieved on an as-needed basis. To reduce the number of data requests and conserve processing and bandwidth resources, metadata may be retrieved when a user navigates to a previously un-traversed portion of the user interface or when the displayed content changes due to a change in search or filtering criteria, among other things. In some embodiments, an AJAX or JSON call is executed to retrieve metadata from local or remote sources.

The navigation module 206 facilitates navigation and browsing of content made available by the application 202. The navigation module 206 may operate in one or more modes. In a carousel navigation mode, the navigation module 206 may provide a user with the ability to easily and efficiently switch the contexts by which content is navigated. For example, a first user interface panel may display a first context by which content items may be browsed. The first context may comprise filtering criteria related to "Top Movies." Under the heading of "Top Movies," the navigation module 206 may provide one or more sub-filters by which content may be browsed and surfaced. As a user traverses the sub-filters, content items displayed in a different portion of the user interface may change to reflect the changing criteria by which the content is being browsed. In some embodiments, the sub-filters for a heading of "Top Movies" may include but are not limited to "Hottest," "Newest," "Top Rated," "Critics Picks," and "Top Free." The user interface panel may be designed to be traversed by directional arrows of a remote control or keyboard, by an input/output device, or by a touch-based computing device.

If the first user interface panel does not provide the context by which a user desires to navigate among content, the user may easily switch contexts by traversing in a left or right direction to a different context. The different context may be presented in its own user interface panel with selectable and traversable sub-filters or sub-contexts provided within the panel to filter the content items displayed in the content display portion of the user interface. For example, if a user cannot find a content item he wants to view in the "Top Movies" context, the user may change contexts to a "Genre" context. At the new context, the user may navigate among different genres and surface content items related to the selected genre.

The ease in which contexts may be switched is made possible by the fact that at any point in the context panel, the user may traverse right or left to switch contexts. In other words, the user is not required to return to a starting point in the user interface to switch contexts. The carousel nature of context switching is illustrated by the ability for a user to traverse right or left and have different context panels rotate and be presented in the user interface for navigating among content. Thus, the carousel nature of context switching enables a user to navigate among two hierarchies of content using four directions (e.g., up, down, left, right). For touch-enabled computing devices, navigation may be accomplished using touch-based gestures, such as horizontal and vertical swipes and taps.

In a second navigation mode, the navigation module 206 may facilitate a pyramidal navigation of content. Content may be presented to the user in a reverse pyramid hierarchy, with broad categories of content or aggregated content presented at a top-most level. In some embodiments, the top-most level may correspond with the carousel context switching panels. As a user traverses downward through the top-most level and reaches the last sub-element of the top-most level, the user may navigate from the top-most level to a middle-tiered level. In some embodiments, the middle-tiered level may feature one or more displayed content items. In some embodiments, the one or more content items first may be displayed in a lower portion of the user interface. Upon traversing from the top-most level to the middle-tier level, the content items may transition from the lower portion of the user interface to the upper portion of the user interface. Thus, the content items may displace the top-most level user interface panels. In conjunction with such displacement, replacing the content items in the lower portion of the user interface may be a set of user interface panels containing details for an individual content item. A user may traverse left and right to navigate among the content items, and as the traversal occurs, the content item detail panels may be populated with information about the selected content item.

A further hierarchical traversal of content may occur when a user traverses from the middle-tiered level depicting content items to a bottom-tiered level depicting details about a particular content item. In some embodiments, the bottom-tiered level may feature one or more panels devoted to different details or aspects of the content item. In some embodiments, such panels may include a content item description panel, a cast panel listing the cast of the content item, a content source panel from which the content item may be viewed, a merchandise panel featuring merchandise related to the content item, a reviews panel featuring reviews of the content item, and a similar content items panel. The user may navigate between panels using motions in a first axis (e.g., horizontal motions, such as left and right arrow selections, horizontally-directed gestures). At any panel, if the user selects one of the items displayed in the panel (e.g., a cast member, a merchandise item, a similar content item), the user may be directed to a new hierarchy involving the selected item. Thus, in this sense, the pyramidal navigation may begin anew and may not be bounded by a start and an end point.

A third navigational mode supported by the navigation module 206 may entail a power browsing mode whereby content may be browsed via a multi-dimensional search. A user interface panel may be presented with sub-categories and options within each sub-category. As a user proceeds through the panel and selects a sub-category and a choice within the sub-category, content items meeting the filtering criteria may be surfaced and displayed. As a user makes selections in multiple sub-categories, a multi-dimensional navigation mode is attained, thereby more quickly surfacing content items than performing a single dimension search.

For example, a user first may select a sub-category "genre" and within the "genre" sub-category, the user may decide to select the "action and adventure," "classics," and "sci-fi and fantasy" genres. Accordingly, content items falling within any of the three selected genres may be displayed in the user interface. A user then may traverse downward in the power browsing panel to the next sub-category. In this example embodiment, the sub-category may be "user ratings." The user may select "2 or more stars," in which case only those content items falling within one of the three selected genres and having a user rating of 2 or more stars may be displayed. The user may continue traversing down the power browsing panel and select a sub-category "release date," and within the sub-category "release date," the user may select "1990s." Thus, only content items falling within the three selected genres having a user rating of 2 or more stars and a release date in the 1990s may be surfaced and displayed. The user may continue traversing the power browsing panel and adding additional dimensions to the filter in order to find the most relevant content items meeting the user's desired filter criteria. Once satisfied, the user may traverse to the displayed content items and select a particular content item for browsing and/or viewing.

A fourth navigational mode supported by the navigation module 206 may be pivot navigation, in which a user may use any piece of data related to a content item as a pivot to discover data related to the data pivot. For example, if a user is browsing a particular content item and views the cast of the item, the user may select a particular cast member and use that cast member as a pivot point. At that point, the focus of the user interface may switch from the content item to the cast member. The user may then select a different content item featuring the cast member. That different content item may become the next pivot point for the user to discover related data. Thus, the user may browse among content-related data using specific data items as pivot points by which to discover additional related data.

While four navigational modes have been discussed herein, one of ordinary skill in the art should appreciate that, at any given state of the application, more than one navigation mode may be used together. In other words, the four navigational modes described herein are not to be considered as mutually exclusive navigational modes.

The filter module 208 may store and supply filters to the navigation module 206 for use in helping a user sort through content to identify specific content items of interest. In some embodiments, the filters may be pre-determined, while in some embodiments, the filters may be customized, such as for example, by the user. The filter module 208 also may receive filtering criteria selections from a user and may perform comparisons between the filtering criteria and metadata related to content items. In some embodiments, the filter module 208 may operate in conjunction with the content retrieval module 204 to retrieve only those content items meeting the filtering criteria. For example, in some embodiments, the filter module 208 may determine based on comparisons of metadata which content items meet the filtering criteria. The filter module 208 may pass the content items meeting the filtering criteria to the content retrieval module 204 for retrieval.

The linking module 210 may maintain one or more data structures that store links between content items and content item-related data. The links may facilitate pivot navigation among disparate pieces of data. In some embodiments, the linking module 210 may examine metadata related to content items to determine if any piece of metadata in one content item overlaps or is related to a piece of metadata from another content item. If an association between metadata of two content items exists, the linking module 210 may store the link between the two pieces of metadata. In some embodiments, the linking module 210 also may perform a link lookup when a user selects a content item-related piece of data. The link lookup may identify all data linked to the selected data. The identified data may be provided to other modules, such as the navigation module 206, to ensure a seamless pivot navigation experience.

The search module 212 provides an additional mechanism by which a user may discover content. In some embodiments, the search module 212 may include a front-facing search engine component that permits users to enter search queries and retrieve relevant content. In some embodiments, the search module 212 may include a back-end component that performs a search of stored content items and/or content item metadata to identify relevant search results. The search results may be identified in response to a search query or in response to navigation of content by the user.

The user interface generator module 214 generates one or more user interfaces for the application 202. The user interfaces enable a user to browse, search, and navigation among content items. In some embodiments, the user interface generator module 214 may generate a series of user interfaces corresponding to each navigational mode provided by the navigation module 206, as described with reference to the discussion of the navigation module 206.

Figure 3:
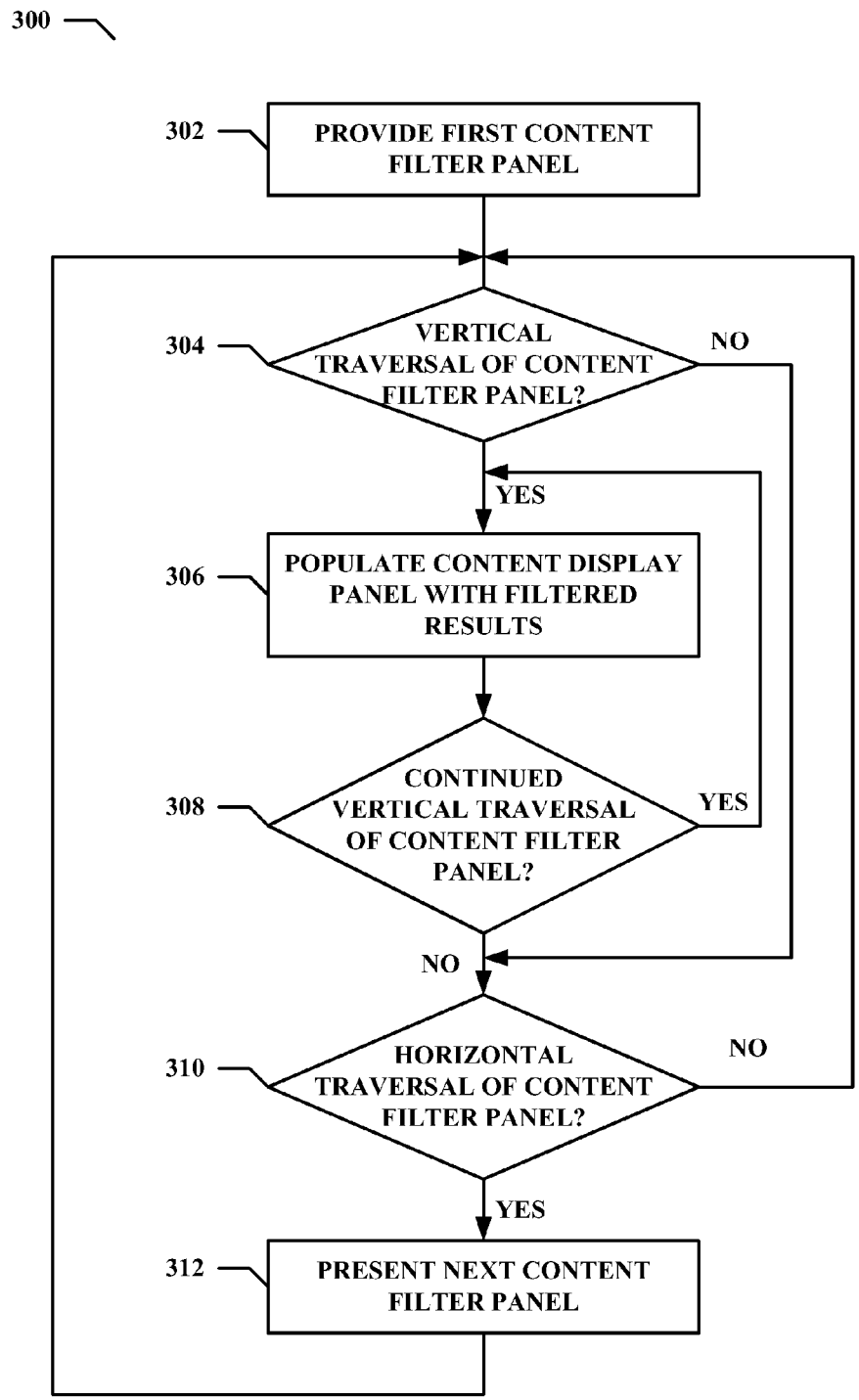
FIG. 3 is a flow diagram illustrating an example method for efficient switching of contexts by which content is navigated, according to some embodiments.

FIG. 3 is a flow diagram illustrating an example method 300 for efficient switching of contexts by which content is navigated, according to some embodiments. Referring to FIG. 3, at block 302, a first content filtering panel is presented in a user interface. The content filtering panel may represent a particular context by which content is to be navigated. The content filtering panel may contain one or more elements therein that represent one or more sub-elements or filters by which to selectively browse content. For example, as previously discussed herein, a "Top Movies" content filtering panel may include sub-elements "Hottest," "Newest," "Top Rated," "Critics Picks," and "Top Free."

At decision block 304, it is determined whether a user is traversing through the content filtering panel in a second axial direction. In some embodiments, the second axis may be the y-axis or a vertical traversal. Vertical traversal may be determined by detecting whether the user is using the up or down arrows of a remote control or keyboard or performing vertically-oriented gestures. If the user is not performing vertical traversal of the content filtering panel, the example method may skip to decision block 310 to determine if the user is performing a horizontal traversal from one content filtering panel to another content filtering panel.

If the user is determined to be vertically traversing the content filtering panel, at block 306, a content item user interface panel may be populated with content items related to the selected sub-element or filter of the content filtering panel. For example, as the user traverses down the "Top Movies" content filtering panel, the user may highlight a particular sub-element. If the user highlights the "Top Rated" sub-element during vertical traversal, the content item panel may be populated with top rated content items.

At decision block 308, it is determined if the user is continuing to vertically traverse through the content filtering panel. If the user is continuing to vertically traverse through the content filtering panel, the example method 300 may return to block 306. If the user is not vertically traversing through the content filtering panel anymore, the example method 300 may proceed to decision block 310.

At decision block 310, it is determined whether the user is horizontally traversing among content filtering panels. Horizontal traversal (e.g., via the right or left arrows) may correspond to the switching of contexts by which content is browsed. If it is determined that horizontal traversing is not occurring, the example method 300 may return to decision block 304 to determine if vertical traversal within the content filtering panel is occurring. If it is determined that horizontal traversing is occurring, at block 312, a new content filtering panel is rotated into a centered position of the user interface for traversal by the user.

Figure 4:
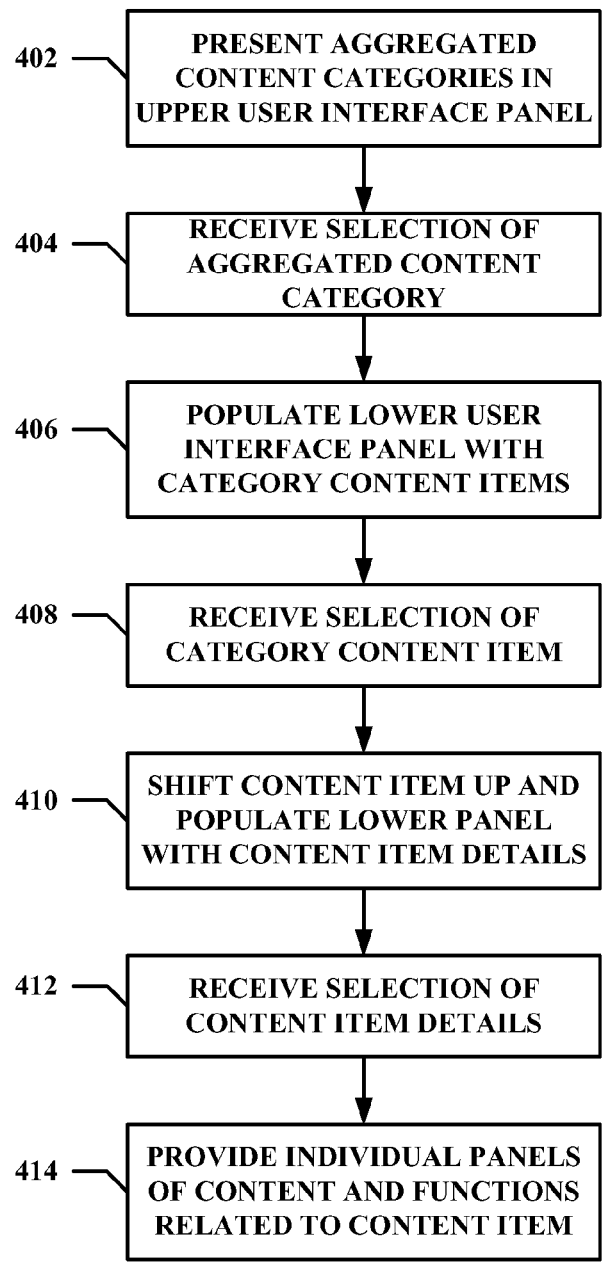
FIG. 4 is a flow diagram illustrating an example method for pyramidal navigation of content, according to some embodiments.

FIG. 4 is a flow diagram illustrating an example method for pyramidal navigation of content, according to some embodiments. Referring to FIG. 4, at block 402, in a user interface for an application that facilitates browsing and accessing of content, an upper portion of the user interface may display aggregated or high level content categories.

At block 404, a selection of a particular content category is received. Receipt of the particular content category may occur via an active selection of the content category, such as for instance, by the user selecting a content category using a remote control, an input device, or a gesture. In some embodiments, receipt of a particular content category may occur simply by the user traversing the presented content categories and highlighting a particular content category with a cursor.

At block 406, a lower portion of the user interface may be populated with content items that related to the selected content category. In some embodiments, cover art and/or a content item title may be displayed to represent the content items.

At block 408, a selection of a particular content item may be received. The selection of the content item may reflect an interest of the user in the particular selected content item. In some embodiments, a selected content item may be denoted by an indicator that visually emphasizes the selected content item in some respect (e.g., highlighted, enlarging the size of the content item).

At block 410, upon the selection of a content item, the content item display level may transition up the user interface to replace the content category portion previously occupying an upper portion of the user interface. At the same time, the portion of the user interface previously occupied by the displayed content items may be populated with one or more user interface panels that feature information related to a specific content item.

At block 412, the application may receive the selection of the details of the selected content item. This selection may be indicated by the vertical traversal of the cursor from the content item panel of the user interface to the content item detail portion of the user interface.

At block 414, the selection of the details of the selected content item may trigger the user interface generator module 214 to re-generate the user interface of the application to exclusively feature user interface panels directed to different aspects of the content item. As previously discussed, the types of panels related to the content item may be varied, and may include panels such as a cast panel, a content source panel, a merchandise panel, a reviews panel, and a similar content item panel. Browsing among these panels may be accomplished through selection of horizontal direction keys (e.g., left and right arrows) or horizontally-oriented gestures.

As applies to each of the blocks described in the example method 400, traversal of the user interface from one hierarchy to another may be accomplished by a user controlling a cursor using the up or down arrows and progressing from the bottom-most element of one hierarchical level to the top-most element of the next hierarchical level. Traversal among elements of the same hierarchical level may be accomplished using horizontal directional selections (e.g., left or right arrow keys, horizontal gestures).

Figure 5:
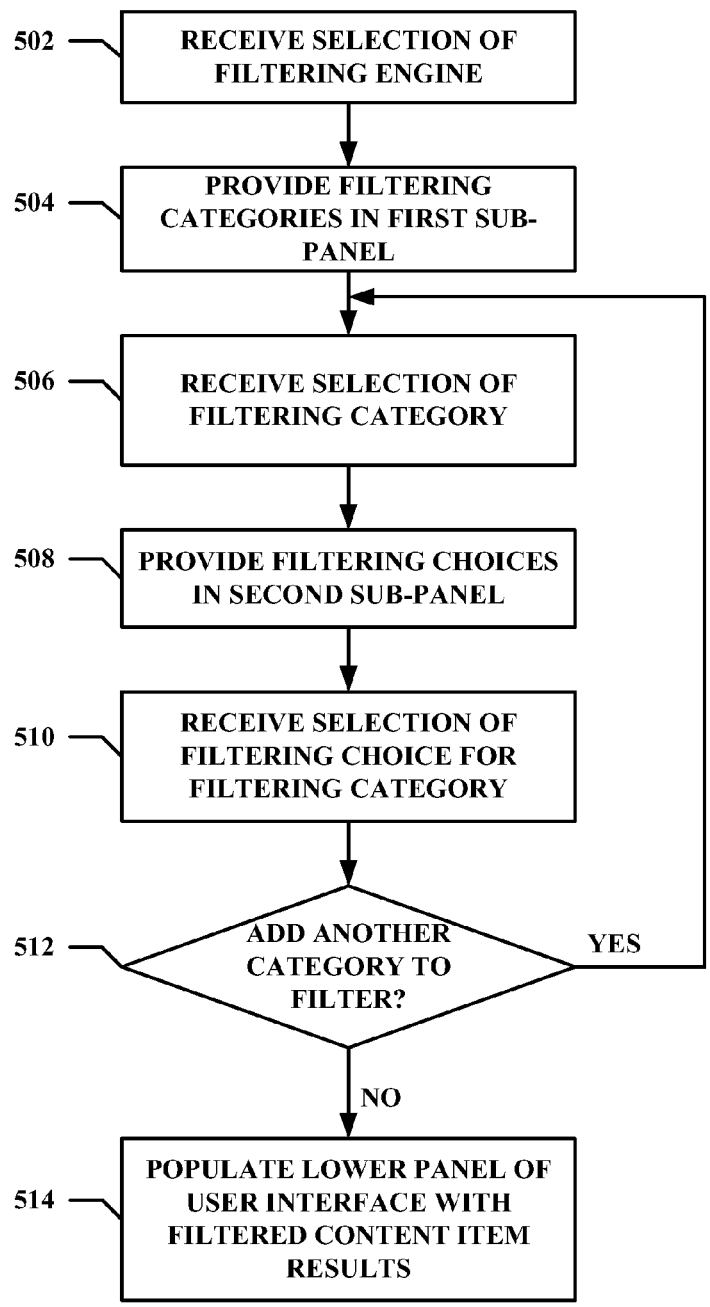
FIG. 5 is a flow diagram illustrating an example method for power browsing of content, according to some embodiments.

FIG. 5 is a flow diagram illustrating an example method for power browsing of content, according to some embodiments. Referring to FIG. 5, at block 502, a selection to navigate using a power browsing tool is received from a user by the application 202. The power browsing tool may comprise a user interface panel containing sub-panels. A first sub-panel may contain navigable filtering categories, and a second sub-panel may contain navigable filtering options for a selected filtering category.

At block 504, the application 202 may populate the filtering category sub-panel with a set of filtering categories. In some embodiments, the filtering categories may be tailored or specifically selected based on the type of content being browsed. In some embodiments, the user may specify which filtering categories are to be provided in the power browsing tool. In some embodiments, the filtering categories may include user-created filtering categories. The filtering categories may be navigable using direction keys (e.g., arrows) on a user input device (e.g., remote control, keyboard) or by touch-based gestures (e.g., swipes).

At block 506, the application 202 may receive a selection of a filtering category. In some embodiments, the filtering category may be selected merely by navigating to the filtering category, while in some embodiments, the filtering category may be selected by navigating to the filtering category and actively selecting the category. As a user navigates among the filtering categories, the navigation indicator may visually emphasize the current location of the indicator. For example, as the user navigates through each listed filtering category, that category may be highlighted, enlarged, or otherwise made noteworthy.

At block 508, upon the selection of a filtering category, the application 202 may direct the user's navigation indicator to a second sub-panel of the power browsing tool to navigate among filtering options for the selected category. The application 202 may populate the second sub-panel with filtering options based on the selected filtering category. In some embodiments, the filter module 208 may receive the selection of the filtering category and may perform a retrieval of the filtering options associated with the filtering category. The filtering options may be provided to the user interface generator module 214 to populate the second sub-panel.

At block 510, the user may select one or more filtering options to apply to the universe of content made accessible by the application 202. For example, if the user selects a filtering category "ratings," the user may have the option of selecting one or more ratings from the possible ratings "G," "PG," "PG-13," "R," and "NC-17."

At block 512, based on the selection of filtering category choices, the application 202 may populate a user interface panel with content items meeting the filtering choices. In some embodiments, the content items may be populated in real-time as filtering choices are selected as opposed to after a user is finished making filtering choices.

At decision block 514, it is determined if the user is adding another category to the filter. If the user is adding another category to the filter, the example method 500 may return to block 506. If the user is finished filtering the content, the example method 500 ends.

Figure 6:
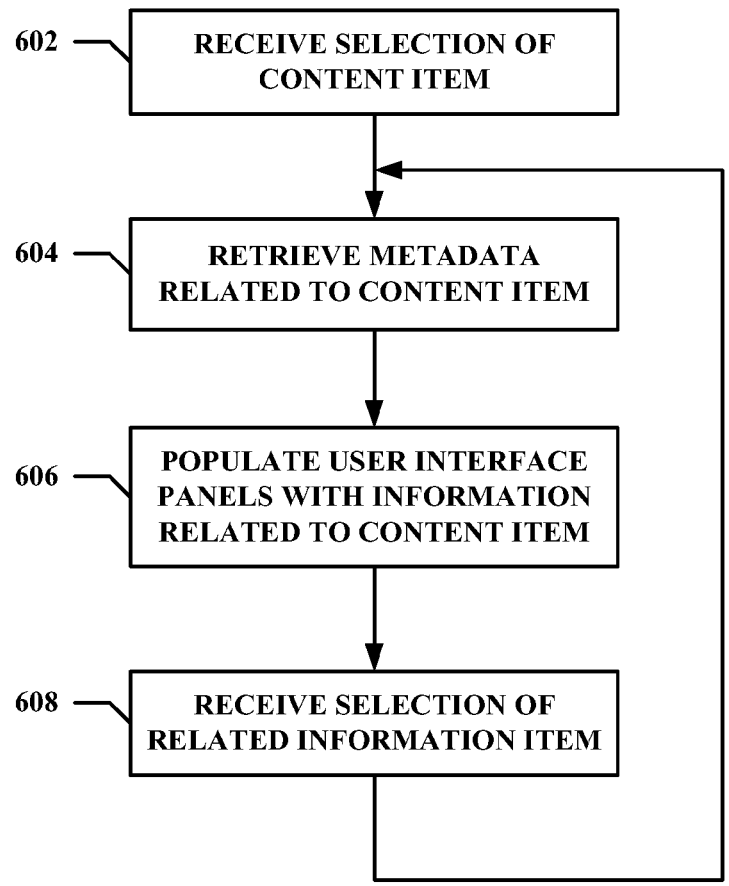
FIG. 6 is a flow diagram illustrating an example method for pivot navigation of content, according to some embodiments.

FIG. 6 is a flow diagram illustrating an example method for pivot navigation of content, according to some embodiments. Referring to FIG. 6, at block 602, the application 202 may receive the selection of a content item. The content item may be discovered using one of the navigation methods disclosed here, may be identified by a search executed by the search module 212, or may be identified using other browsing methodologies.

At block 604, in response to receiving the selection of a content item, the content retrieval module 204 of the application 202 may retrieve metadata related to the content item. In some embodiments, the content retrieval module 204 may use a content item identifier to retrieve metadata related to the content item. In some embodiments, metadata related to the content item may be associated with the content item identifier. In some embodiments, the content item identifier may be an identifier used by the application 202 to identify the content item. In the event metadata is to be retrieved from a remote source, the content retrieval module 204 may query a data structure using the application content item identifier to identify an identifier used by the remote source. The remote source identifier may then be used to retrieve content item metadata from the remote source (e.g., via an API call).

At block 606, one or more user interface panels may be populated with information related to the content item. In some embodiments, the user interface panels may be displayed as part of a content detail page that displays information solely related to the selected content item. In some embodiments, each user interface panel may be devoted to a different aspect of the content item. For example, one panel may provide a content item description, while a second panel may provide a listing of the cast of the content item, and a third panel may provide one or more reviews, and so forth. In some embodiments, a user interface panel may be populated by the application 202 only when the panel is actively selected and displayed in order to conserve resources and prevent unnecessary retrieval of metadata.

At block 608, the application 202 may receive a selection of a related information item. For example, when the user is navigating and viewing information related to a selected content item, the user may select a related information item displayed in one of the user interface panels. Selection of the related information item may cause navigation of content to pivot around the selected information item. The example method 600 may return to block 604 to retrieve metadata related to the related information item. In this respect, navigation of content may be pivoted on any displayed information item without having to restart navigation from an initial point.

Figure 7:
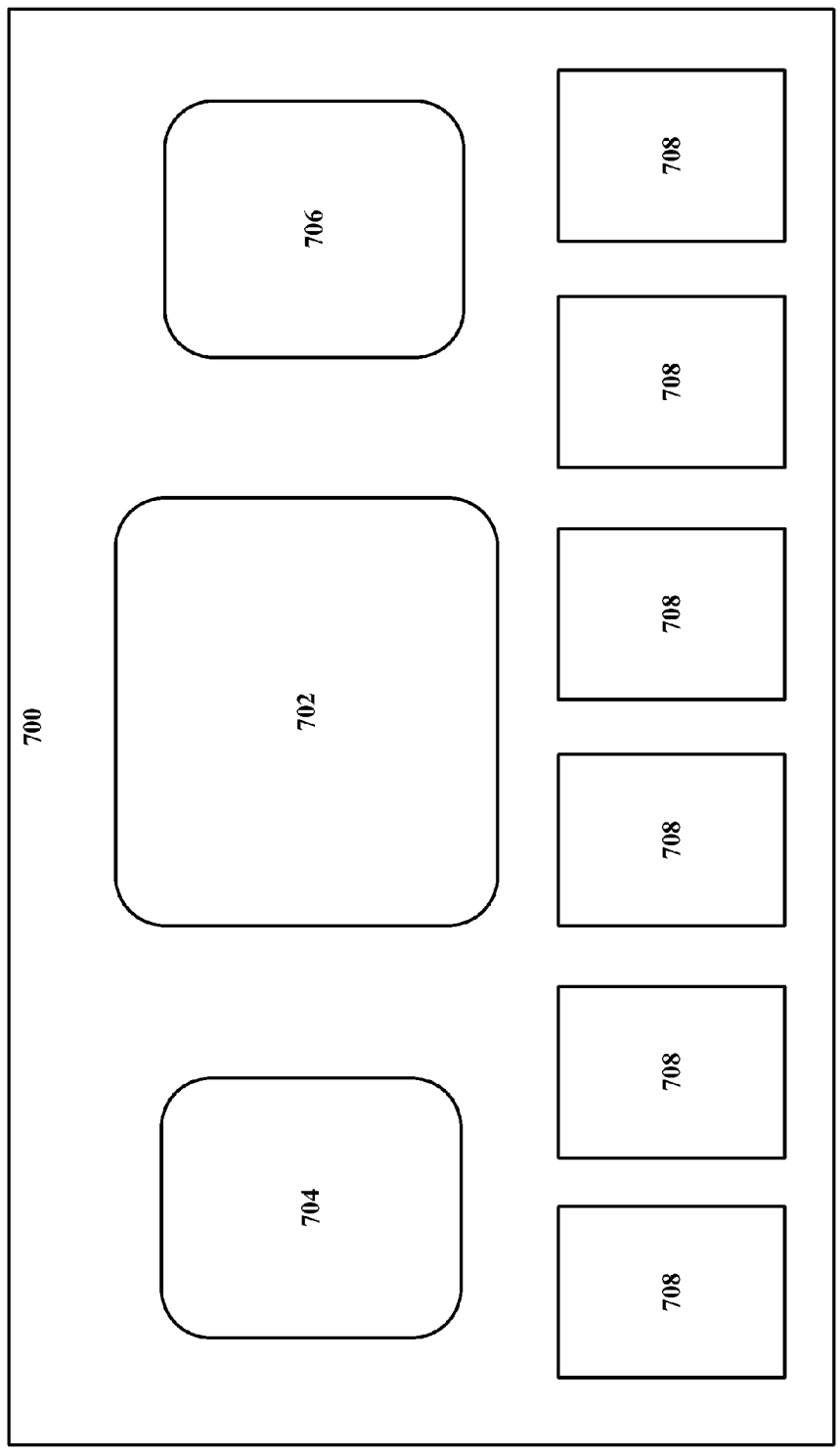
FIG. 7 is a diagram of an example user interface for efficient switching of contexts by which content is navigated, according to some embodiments.

FIG. 7 is a diagram of an example user interface for efficient switching of contexts by which content is navigated, according to some embodiments. In the example user interface 700 of FIG. 7, an upper portion of the user interface may include one or more user interface panels. The user interface panels 702, 704, 706 may be rotatable such that one user interface panel 704 is prominently displayed in the center of the user interface 700. Additional user interface panels 702 and 706 may be located on either side of the active user interface panel 704 and may be accessed by traversing in horizontal directions (e.g., left and right) via a user input device or via a touch-based gesture. The user interface panel 704 displayed in the center of user interface 700 may be considered to be the active panel.

Each user interface panel 702, 704, and 706 may contain and display one or more filters (not shown) that may be applied to content to obtain filtered content. The filters contained in each user interface panel 702, 704, and 706 may be navigated by a vertical motions (e.g., up and down arrows) performed on a user input device or by vertical touch-based gestures. As a navigation indicator highlights each filter within a user interface panel, content items 708 displayed in a lower portion of the user interface may update to reflect the results of the filter being highlighted.

In the event the user does not want to filter the displayed content items using a filter contained in user interface panel 702, the user may rotate the user interface panels to activate either panel 704 or 706. In some embodiments, panels 704 and 706 may filter content according to different contexts. For example, panel 702 may contain filters related to "Top Movies," while panel 704 may contain filters related to "Genres," and panel 706 may contain filters related to "Ratings." Thus, by activating a different panel, the user may switch the context by which content is being filtered.

Figure 8A:
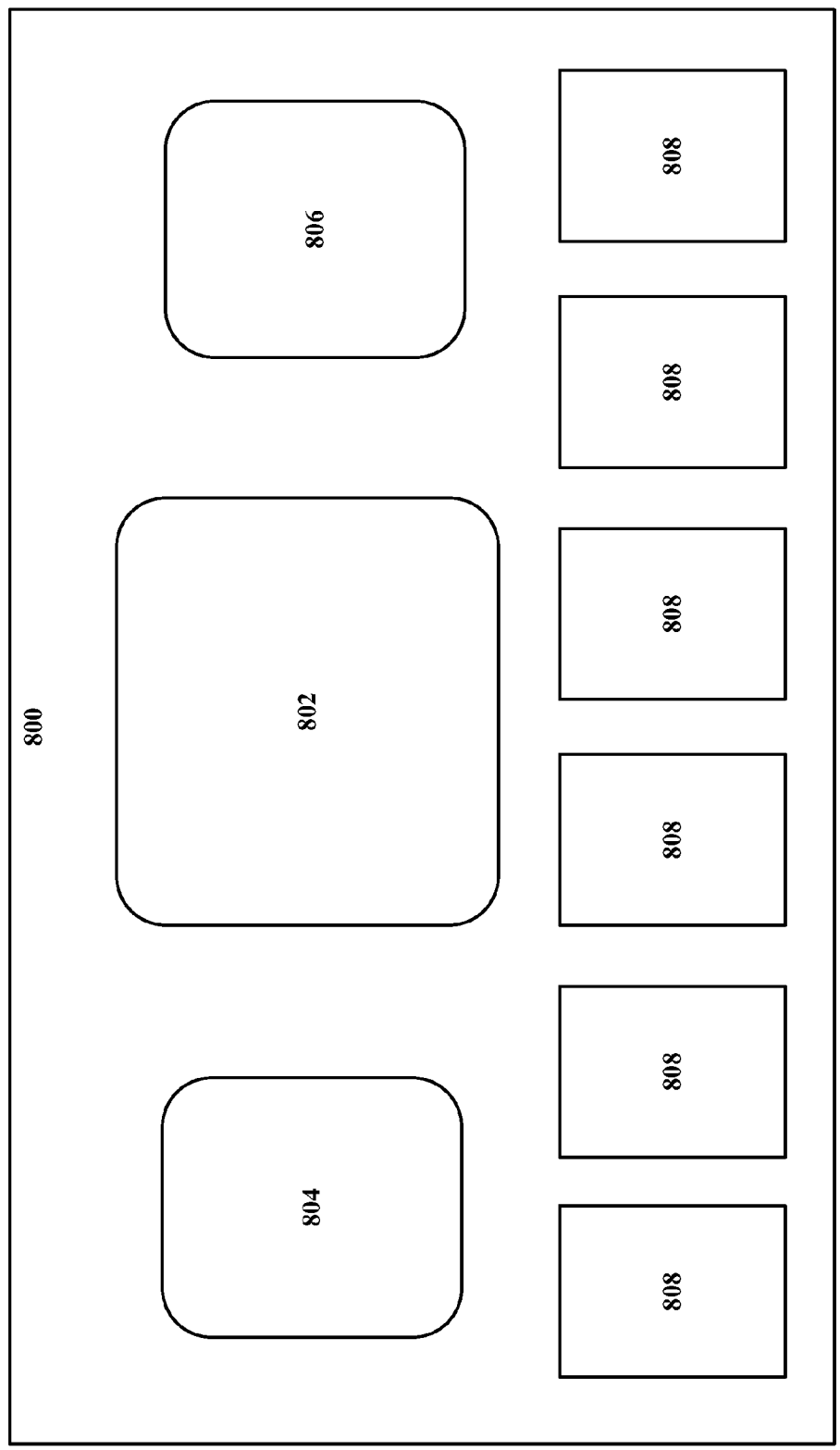
FIG. 8A is a diagram of an example user interface for pyramidal navigation of content, according to some embodiments.

FIG. 8A is a diagram of an example user interface for pyramidal navigation of content, according to some embodiments. Referring to FIG. 8A, a user interface 800 of an application for navigating and viewing content is shown. The user interface 800 may include one or more content filtering panels 802, 804, and 806 and one or more displayed content items 808. Content filtering panels 802, 804, and 806 may be containers that include navigable and selectable filters that may be applied to filter the displayed content items 808. Each content filtering panel 802, 804, and 806 may filter content according to a different context. Displayed content items 808 may be images, such as covers, screenshots, or art work, associated with the content items.

A user may switch content panels by traversing among the content panels 802, 804, and 806 horizontally (e.g., by using left and right arrows, by using horizontal touch-based gestures, by selecting left and right arrows (not shown) in the user interface 800). Within a content filtering panel, the user may vertically navigate among the different displayed filters to cause the displayed content items 808 to change in response thereto. When the user reaches the last filter contained in a content filter panel, a further downward action may cause a navigation indicator (e.g., a cursor, a selector, a box) to traverse to the displayed content items 808, such that a user may use the navigation indicator to select a specific displayed content item 808.

FIG. 8B is a diagram of an example user interface for pyramidal navigation of content, according to some embodiments. Referring to FIG. 8B, in response to the navigation indicator selecting or highlighting a displayed content item, the user interface 800 may perform a transition whereby the displayed content items 808 are shifted upward to replace the real estate previously occupied by the content filtering panels 802, 804, and 806. Replacing the displayed content items 808 at the lower portion of the user interface 800 may be content item-specific user interface panels 810, 812, and 814. Each panel 810, 812, and 814 may be populated with information specific to a selected content item 808. For example, panel 810 may display an image or images (e.g., cover art, screenshot, art work) associated with a selected content item 808. Continuing with the example, panel 812 may display one or more content sources from which the selected content item 808 may be retrieved and viewed. Further continuing with the example, panel 814 may display a description of the selected content item 808, such as a plot synopsis or summary. A selectable user interface element, shown as a downward facing arrow 816, in the user interface 800 may instruct the user that further hierarchical or vertical traversal of content is possible.

FIG. 8C is a diagram of an example user interface for pyramidal navigation of content, according to some embodiments. Referring to FIG. 8C, in response the selection of the arrow 816 shown in FIG. 8B, the user interface 800 may again transition to a state where specific content panels for a single content item are shown. The user interface 800 in this state may be referred to as the Content Details Page. The Content Details Page may depict the same content item-specific user interface panels 810, 812, and 814 shown in FIG. 8B, but with each of the panels 810, 812, and 814 enlarged in size and prominently displayed in the user interface 800. As discussed above with respect to the example embodiment of FIG. 8B, the panels 810, 812, and 814 may each include information related to a different aspect of a specific content item. Panels 810, 812, and 814 may be rotatable such that a user may scroll through the panels to view different informational aspects about the content item. In some embodiments, panels 810, 812, and 814 may include user selectable information elements. For example, if one of the panels contained information about the content sources from which the content item could be retrieved and viewed, each of the content sources listed in the panel may be selectable such that the user would initiate a retrieval of the content item from the selected content source. Additionally, selection of an information element in one of the panels depicted in the Content Detail Page could trigger a pivot navigation flow, whereby navigation would be re-centered and redirected from the selected content item to the selected information element.

It should be appreciated that while discussion has centered on increasing the granularity of content by traversing down a hierarchy of content, a user may similarly navigate upwards to decrease the level of granularity of the information provided with respect to content.

Figure 9:
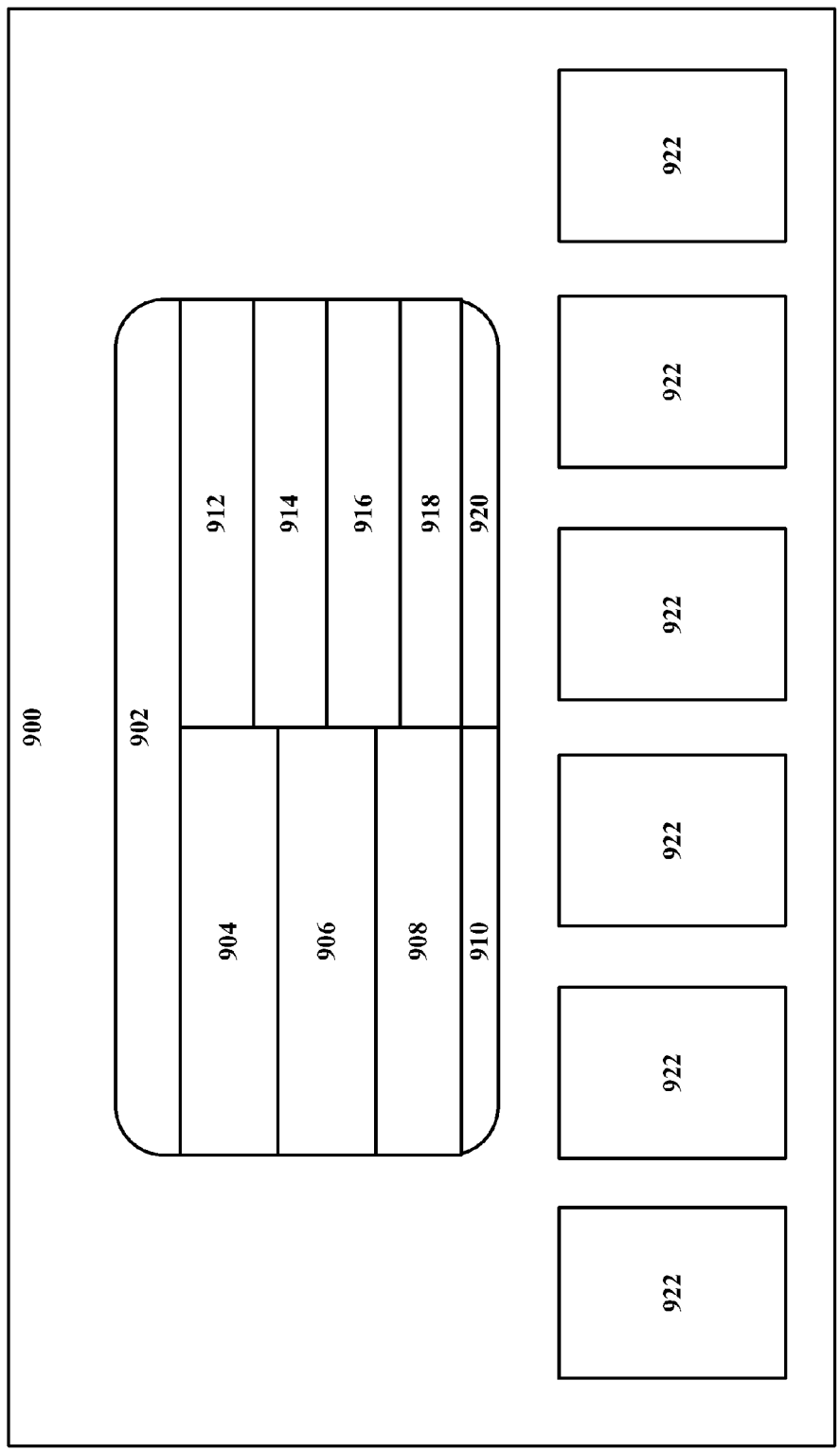
FIG. 9 is a diagram of an example user interface for power browsing of content, according to some embodiments.

FIG. 9 is a diagram of an example user interface for power browsing of content, according to some embodiments. Referring to FIG. 9, an example user interface 900 containing a power browsing tool 902 is depicted. The power browsing tool 902 may enable a user to filter content according to multiple user-selectable dimensions. The power browsing tool 902 may include a first sub-panel containing filter categories 904, 906, 908, and 910. The filter categories 904, 906, 908, and 910 may be navigable and selectable by a user operating a user input device (e.g., a remote control, a keyboard, a mouse) or by a touch-based gesture. Upon the selection of a filter category, for example, category 904, a navigation indicator (e.g., a cursor, a selector, a box) controlled by the user may be navigated to a second sub-panel containing one or more filter options 912, 914, 916, 918, and 920. The filter options 912, 914, 916, 918, and 920 may be navigated by the user and selected by the user. The power browsing tool 902 may enable a user to select multiple filter options for a selected filter category (e.g., category 904). As a user selects filter options, content items 922 displayed in the user interface 900 may be updated to reflect the application of the filter options to the universe of available content.

Upon finishing selection of filter options for a particular category, the user may return to the first sub-panel and select a different filter category. The user may select one or more filter options for the different filter category. The process of selecting a category and filter options associated therewith may continue until all categories have been selected or until the user has finished selecting filters. Based on the filters selected, the content items 922 displayed in the user interface 900 may be updated to reflect a set of content items 922 that most closely satisfy the filter conditions selected by the user.

It should be appreciated that the dimensions and placement of the user interfaces and its elements as depicted in the foregoing embodiments are not to be construed as limiting for the purposes of the discussion herein.

Modules, Components and Logic

Certain embodiments are described herein as including logic or a number of components, modules, or mechanisms. A component or module is a non-transitory and tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component or a module may be implemented mechanically or electronically. For example, a component or a module may comprise dedicated circuitry or logic that is permanently configured (e.g., as a special-purpose processor) to perform certain operations. A component or a module also may comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" or "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components or modules are temporarily configured (e.g., programmed), each of the components or modules need not be configured or instantiated at any one instance in time. For example, where the components or modules comprise a general-purpose processor configured using software, the general-purpose processor may be configured as respective different components at different times. Software may accordingly configure a processor, for example, to constitute a particular component or module at one instance of time and to constitute a different component or module at a different instance of time.

Components or modules can provide information to, and receive information from, other components or modules. Accordingly, the described components may be regarded as being communicatively coupled. Where multiple of such components or modules exist contemporaneously, communications may be achieved through signal transmission (e.g., over appropriate circuits and buses) that connect the components or modules. In embodiments in which multiple components or modules are configured or instantiated at different times, communications between such components or modules may be achieved, for example, through the storage and retrieval of information in memory structures to which the multiple components or modules have access. For example, one component or module may perform an operation, and store the output of that operation in a memory device to which it is communicatively coupled. A further component or module may then, at a later time, access the memory device to retrieve and process the stored output. Components or modules may also initiate communications with input or output devices, and can operate on a resource (e.g., a collection of information).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

Figure 10:
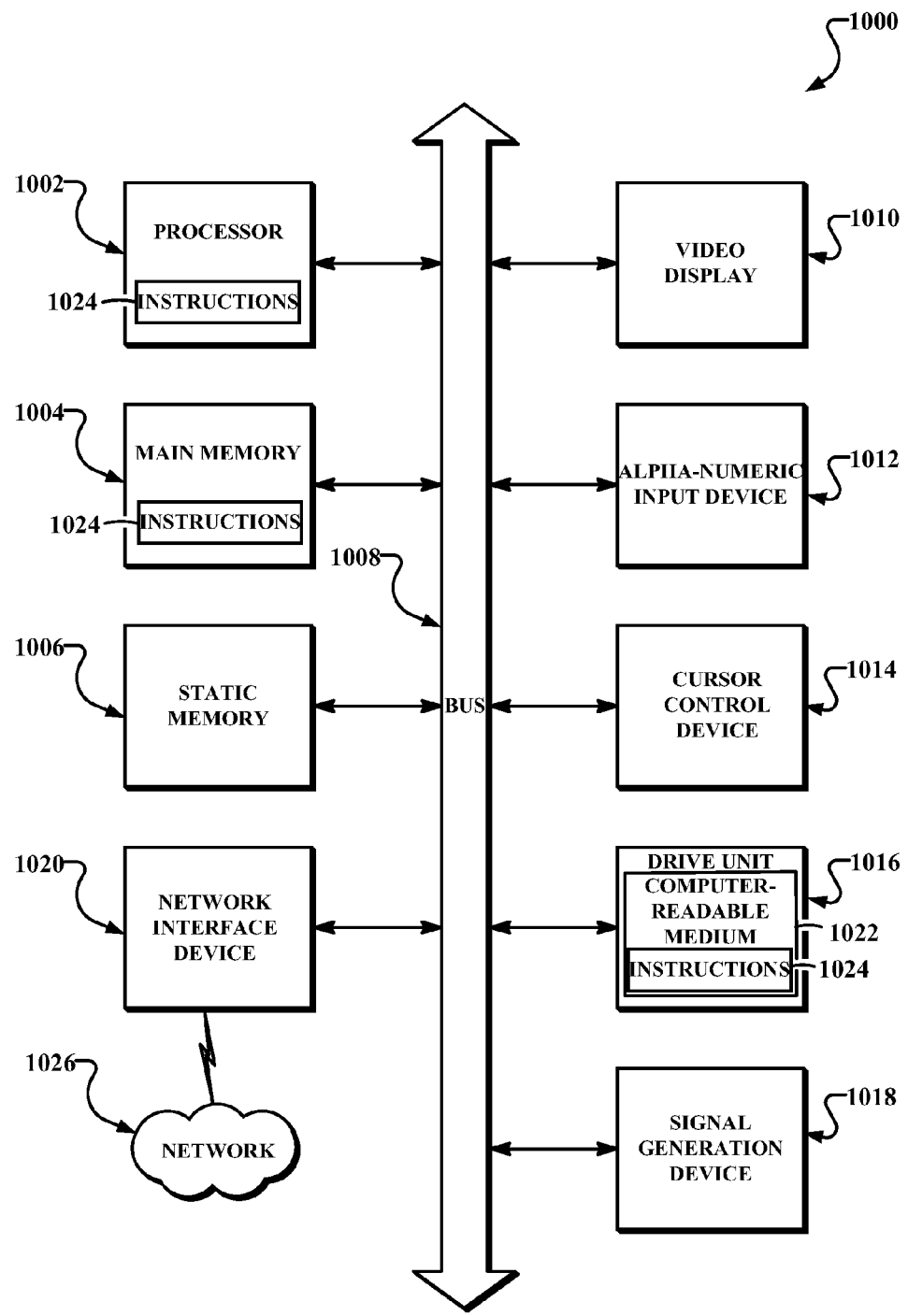
FIG. 10 shows a diagrammatic representation of a machine in the example form of a computer system.

FIG. 10 is a block diagram of machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes at least one processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software 1024) embodying or utilized by any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any non-transitory tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 1024 may further be transmitted or received over a communications network 1026 using a transmission medium. The software 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible medium to facilitate communication of such software.

Example Three-Tier Software Architecture

In some embodiments, the described methods may be implemented using one a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third storage tier may be a persistent storage medium or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, distributed or so some other suitable configuration. Further, these three tiers may be distributed between more than one computer systems as various components.

Components

Example embodiments may include the above described tiers, and processes or operations about constituting these tiers may be implemented as components. Common to many of these components is the ability to generate, use, and manipulate data. The components, and the functionality associated with each, may form part of standalone, client, or server computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server and/or client software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client may for example include five layers comprising: an application layer, a transport layer, a network layer, a data link layer, and a physical layer. In the case of software, for instantiating or configuring components, having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an Internet, Local Area Network (LAN), Wide Area Network (WAN), or some other suitable network. In some cases, Internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method, comprising:
providing a plurality of content filter panels in a user interface of an application for browsing and viewing media content, each content filter panel containing a plurality of selectable filters for filtering media content items;
determining, by at least one hardware processor, a direction of movement of a navigation indicator within an active content filter panel, the navigation indicator controlled by a user;
receiving a first selection of a first plurality of selectable filters on the first content filter panel;
based on a determination of a movement direction of the navigation indicator in a first axis, switching, by the at least one hardware processor, the active content filter panel from a first content filter panel to a second content filter panel;
based on a determination of a movement direction of the navigation indicator in a second axis, navigating through the plurality of selectable filters on the second content filter panel;
receiving a second selection of a second plurality of selectable filters on the second content filter panel;
filtering, by the at least one hardware processor, the media content items according to the first selection of the first plurality of selectable filters and the second selection of the second plurality of selectable filters;
causing at least one of the filtered media content items to be displayed along with the active content filter panel in the user interface;
receiving a third selection of the at least one of the filtered media content items; and
in response to the third selection of the at least one of the filtered media content items, generating for display a transition whereby the at least one of the filtered media content items shifts upwards to replace the plurality of content filter panels in the user interface.

2. The method of claim 1, wherein the navigation indicator is controlled by one of a remote control operated by the user, a keyboard operated by the user, a mouse operated by the user, and a touch-based gesture performed by the user.

3. The method of claim 1, further comprising:
comparing the media content items to the selected plurality of filters; and
retrieving metadata associated with the filtered media content items for use in the displaying of the filtered media content.

4. The method of claim 1, wherein the switching of the active content filter panel comprises moving the second content filter panel to a position in the user interface occupied by the first content filter panel.

5. The method of claim 1, wherein the content filter panels occupy a first portion of the user interface, wherein the filtered media content items occupy a second portion of the user interface, and wherein the first portion of the user interface is positioned above the second portion of the user interface.

6. The method of claim 1, wherein dimensions of the active content filter panel are larger than the dimensions of inactive content filter panels.

7. The method of claim 1, wherein each content filter panel represents a context by which the media content items are navigated and filtered.

8. The method of claim 1, wherein the first axis is a horizontal axis and the second axis is a vertical axis.

9. A non-transitory machine-readable storage medium storing a set of instructions that, when executed by at least one hardware processor, causes the at least one hardware processor to perform operations comprising:

provioding a plurality of content filter panels in a user interface of an application for browsing and viewing media content, each content filter panel containing a plurality of selectable filters for filtering media content items;

determining, by at least one hardware processor, a direction of movement of a navigation indicator within an active content filter panel, the navigation indicator controlled by a user;

receiving a first selection of a first plurality of selectable filters on the first content filter panel;

based on a determination of a movement direction of the navigation indicator in a first axis, switching, by the at least one hardware processor, the active content filter panel from a first content filter panel to a second content filter panel;

based on a determination of a movement direction of the navigation indicator in a second axis, navigating through the plurality of selectable filters on the second content filter panel;

receiving a second selection of a second plurality of selectable filters on the second content filter panel;

filtering, by the at least one hardware processor, the media content items according to the first selection of the first plurality of selectable filters and the second selection of the second plurality of selectable filters;

causing at least one of the filtered media content items to be displayed along with the active content filter panel in the user interface;

receiving a third selection of the at least one of the filtered media content items; and in response to the third selection of the at least one of the filtered media content items, generating for display a transition whereby the at least one of the filtered media content items shifts upwards to replace the plurality of content filter panels in the user interface.

10. The non-transitory machine-readable storage medium of claim 9, wherein the navigation indicator is controlled by one of a remote control operated by the user, a keyboard operated by the user, a mouse operated by the user, and a touch-based gesture performed by the user.

11. The non-transitory machine-readable storage medium of claim 9, further comprising:

comparing the media content items to the selected filter; and retrieving metadata associated with the filtered media content items for use in the displaying of the filtered media content.

12. The non-transitory machine-readable storage medium of claim 9, wherein the switching of the active content filter panel comprises moving the second content filter panel to a position in the user interface occupied by the first content filter panel.

13. The non-transitory machine-readable storage medium of claim 9, wherein the content filter panels occupy a first portion of the user interface, wherein the filtered media content items occupy a second portion of the user interface, and wherein the first portion of the user interface is positioned above the second portion of the user interface.

14. The non-transitory machine-readable storage medium of claim 9, wherein dimensions of the active content filter panel are larger than the dimensions of inactive content filter panels.

15. The non-transitory machine-readable storage medium of claim 9, wherein each content filter panel represents a context by which the media content items are navigated and filtered.

16. The non-transitory machine-readable storage medium of claim 9, wherein the first axis is a horizontal axis and the second axis is a vertical axis.

17. A system, comprising:

at least one hardware processor;

a user interface generator module, implemented by the at least one hardware processor, configured to generate a user interface of an application for browsing and viewing media content, the user interface including a plurality of content filter panels each containing a plurality of selectable filters for filtering media content items;

a navigation module, implemented by the at least one hardware processor, configured to:

determine a direction of movement of a navigation indicator within an active content filter panel, the navigation indicator controlled by a user; and based on a determination of a movement direction of the navigation indicator in a first axis, switch the active content filter panel from a first content filter panel to a second content filter panel; and a filter module, implemented by the at least one hardware processor, configured to:

receive a first selection of a first plurality of selectable filters on the first content filter panel;

navigate through the plurality of selectable filters on the second content filter panel based on a determination of a movement direction of the navigation indicator in a second axis;

receive a second selection of a second plurality of selectable filters on the second content filter panel; and filter the media content items according to the first selection of the first plurality of selectable filters and the second selection of the second plurality of selectable filters, the user interface generator module causing at least one of the filtered media content items to be displayed along with the active content filter panel in the user interface, the navigation module receiving a third selection of the at least one of the filtered media content items, and in response to the third selection of the at least one of the filtered media content items, generating for display a transition whereby the at least one of the filtered media content items shifts upwards to replace the plurality of content filter panels in the user interface.

18. The system of claim 17, wherein the navigation indicator is controlled by one of a remote control operated by the user, a keyboard operated by the user, a mouse operated by the user, and a touch-based gesture performed by the user.

19. The system of claim 17, wherein the filter module is further configured to compare the media content items to the selected filter, and further comprising a content retrieval module, implemented by the at least one hardware processor, configured to retrieve metadata associated with the filtered media content items for use in the displaying of the filtered media content.

20. The system of claim 17, wherein the navigation module is configured to switch of the active content filter panel by moving the second content filter panel to a position in the user interface occupied by the first content filter panel.

21. The system of claim 17, wherein the content filter panels occupy a first portion of the user interface, wherein the filtered media content items occupy a second portion of the user interface, and wherein the first portion of the user interface is positioned above the second portion of the user interface.

22. The system of claim 17, wherein dimensions of the active content filter panel are larger than the dimensions of inactive content filter panels.

23. The system of claim 17, wherein each content filter panel represents a context by which the media content items are navigated and filtered.

24. The system of claim 17, wherein the first axis is a horizontal axis and the second axis is a vertical axis.

* * * * *